United States Patent [19]
Montgomery, Jr. et al.

[11] 3,841,855
[45] Oct. 15, 1974

[54] GLASS TEMPERING CONTROL SYSTEM

[75] Inventors: William S. Montgomery, Jr., Norristown; William E. Marceau, Horsham; William G. Bates, Sellersville, all of Pa.

[73] Assignee: Selas Corporation of America, Dresher, Pa.

[22] Filed: Jan. 8, 1973

[21] Appl. No.: 322,028

[52] U.S. Cl.................. 65/29, 65/114, 65/119, 65/162
[51] Int. Cl............................................ C03b 27/00
[58] Field of Search........ 65/95, 114, 117, 118, 119, 65/162, 203, 29

[56] References Cited
UNITED STATES PATENTS
3,744,985   7/1973   Peternel........................... 65/118 X Primary Examiner—Arthur D. Kellogg

[57] ABSTRACT

The invention is directed to the heating of glass sheets for tempering by dividing the heating furnace into zones and controlling individually the temperature of each zone in such a manner that the sheets are raised to a substantially uniform temperature in a minimum of time.

9 Claims, 3 Drawing Figures

INDEX GLASS TO QUENCH

GLASS TEMPERING CONTROL SYSTEM

BACKGROUND OF INVENTION

The present invention relates to the tempering of glass, and more particularly to a method of heating a sheet of glass uniformly throughout its area to tempering temperature.

The tempering of glass consists in heating the glass to a temperature above its upper critical temperature and rapidly quenching it. When glass is heated to this temperature its viscosity begins to decrease rapidly, which can result in distortion. Therefore, it is desirable to quench the glass at the lowest possible temperature. If the glass is not heated uniformly the tempered characteristics will vary with a consequent lowering of quality.

As a practical matter, the actual temperature of the glass is desirably measured only at one point in the furnace by a radiation device. Thus, if the glass is uniformly heated, this one point on the glass can be monitored and used to control transfer from the furnace to the quench. Also, the temperature can be set as low as possible without the necessity of allowing the usual large margin of error to be sure all portions of the glass are above the upper critical.

Most heating processes involve a heating cycle to bring the work up to the desired temperature and a soak cycle to permit all portions of the work to even out at the desired temperature. In most thermal processes the soak cycle is the most important from the standpoint of control, with the heating cycle being designed to bring the work up to temperature as rapidly as possible.

In the heating of glass for tempering, this lack of attention to the heating cycle is critical because, unlike other thermal processes, in the batch heating of glass sheets almost the entire process is in bringing the glass up to temperature with the soaking being, relatively speaking, extremely short.

SUMMARY OF INVENTION

With the present invention, the glass heating furnace is divided into a number of zones, each of which has its set point individually adjusted to some desired temperature. Thus, various parts of the furnace that may be subjected to different conditions, such as draughts, etc., may be fired at individual rates to bring each zone to the same temperature.

When the furnace door is opened for the introduction of a sheet of glass to be tempered, and the glass is introduced, the furnace is cooled. At this time the set point for the control zones is reduced in such a manner that the zones are maintained at substantially the same temperature as the fuel supply is increased to return the temperature to the desired value. After a short time, when the furnace temperature begins to rise, the set point is raised to the desired final temperature in such a manner that the various zones are brought up to that temperature at substantially the same rate in substantially the same time.

Since the entire furnace is kept at the same temperature through the zone control, the entire area of the glass will be heated evenly. An element responsive to glass temperature will actuate mechanism to move the glass from the furnace into the quench. Thus, the evenly heated sheet of glass will be quenched when it has reached the lowest satisfactory temperature.

Accordingly, it is an object of the invention to provide a method of heating glass sheets for tempering.

It is a further object of the invention to provide a method of controlling the heating of a glass sheet to insure that the sheet is heated evenly and that it is heated in the least possible time.

An additional object of the invention is to provide a furnace and a particularity system therefore that will accurately control the temperature and changes in temperature of the furnace. The system can be used for controlling any furnace, but is particularly useful in controlling a furnace used to heat glass sheets for tempering.

The various features of novelty which characterize our invention are pointed out with aprticularity in the claims annexed to and forming a part of this specification. For a better understanding of the invention, however, its advantages and specific objects attained with its use, reference should be had to the acccompanying drawings and descriptive matter in which we have illustrated and described a preferred embodiment of the invention.

IN THE DRAWINGS

DETAILED DESCRIPTION

Figure 1:
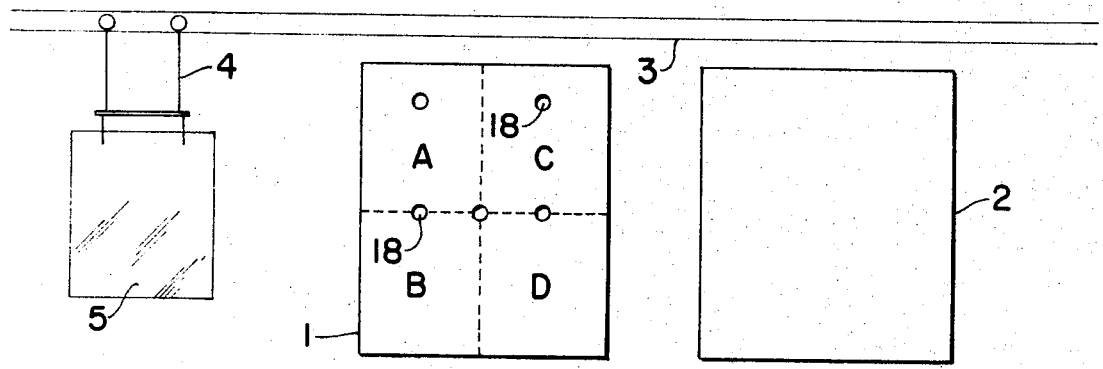
FIG. 1 is a diagrammatic view of a glass tempering system.

Referring to FIG. 1, there is, diagrammatically shown, a furnace 1 in which glass sheets are heated before being moved into a quench 2 where blasts of cooling air are directed against opposite sides of the sheet. Glass is moved into and from the furnace by a carrier 4 that travels on a track 3 extending over both furnace and quench. A sheet of glass ready to be moved into the furnace is shown at 5.

Furnace 1, which may be fuel fired or electric, is shown as being divided into four zones, A, B, C, and D, for purposes of control. It will be obvious that the furnace can be divided in as many zones as desired, the choice depending mainly upon the size of the furnace and the size of the sheets being heated.

Figure 2:
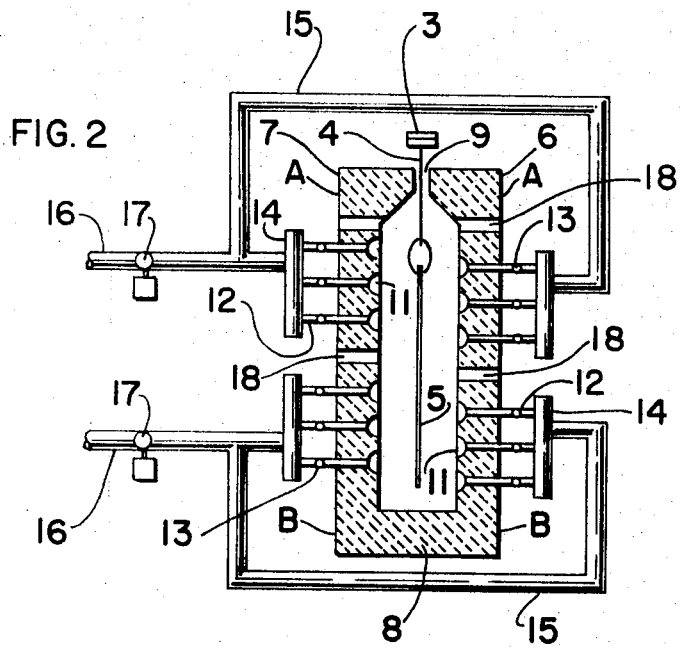
FIG. 2 is a section through a glass heating furnace.

As shown in FIG. 2, the furnace has opposite side walls 6 and 7, a bottom 8, and a roof having a slot 9 therein through which carriage 4 extends to hold glass 5 in the furnace. Each side wall is provided with heating elements which, in this case, comprise a plurality of rows of burners 11 that are preferably of the well-known radiant cup type. Each burner is supplied with fuel through a pipe 12 which has a valve 13 in it. On each side of the furnace the burners of each zone are supplied by a manifold 14 with the manifolds of the opposed burners in the opposite side walls of each zone being joined by a pipe 15. Each zone is supplied with fuel from a main 16 having in it a control valve 17. Exhaust openings 18 are provided in the side walls of the furnace substantially between the zones and near the top. Products of combustion can escape through these openings, thereby reducing the effect that the heating of one zone can have on another.

As noted above, each of the zones of the furnace has its temperature individually controlled. The controls for the various zones, however, are interconnected in such a way that the temperatures of the various zones are kept substantially equal. The control instruments used are of commercially available types, but for purposes of description herein, simplified versions of instruments having the required control characteristics are disclosed. Since each zone control system is the same, a description of one will suffice.

The temperature of each zone is measured by a thermocouple, or other temperature responsive device 21. The voltage developed by the thermocouple is impressed upon a coil 22 of a millivoltmeter type instrument, producing a deflection of a pointer 24. A voltage equal and opposite to the voltage produced by the thermocouple at a given temperature is impressed in the circuit by a battery 25 connected across a variable resistance 26. The amount of resistance 26 in the circuit is adjusted to be equal to the voltage of thermocouple 21 at a desired value. Therefore, when the zone is at this temperature, pointer 24 is undeflected and between contacts 27 and 28. Any deflection of the pointer, indicating a change in temperature, will close a circuit through one of the contacts to energize a valve adjusting motor 29 for rotation in one or an opposite direction. Fuel flowing through pipe 16 is thereby adjusted in a direction to bring the zone back toward the desired temperature.

Also cooperating with pointer 24 are two additional pairs of contacts 31, 32 and 33, 34. The high temperature or right ends of contacts 31 and 32 are set to be bridged, to close a circuit, when pointer 24 has deflected to approximately 20°F below the set point. Similarly, the left or low temperature ends of contacts 33 and 34 are bridged by pointer 24 until the temperature falls to about 20°F below the set point. The location of these pairs of contacts can be adjusted, of course, but for the operation of the average furnace the described position is quite satisfactory. Bridging of one or the other of these two pairs of contacts energizes a motor 35, in a manner to be described, to adjust the position of a contact 36 along resistance 26, thereby to vary the bias applied in the thermocouple circuit.

Figure 3:
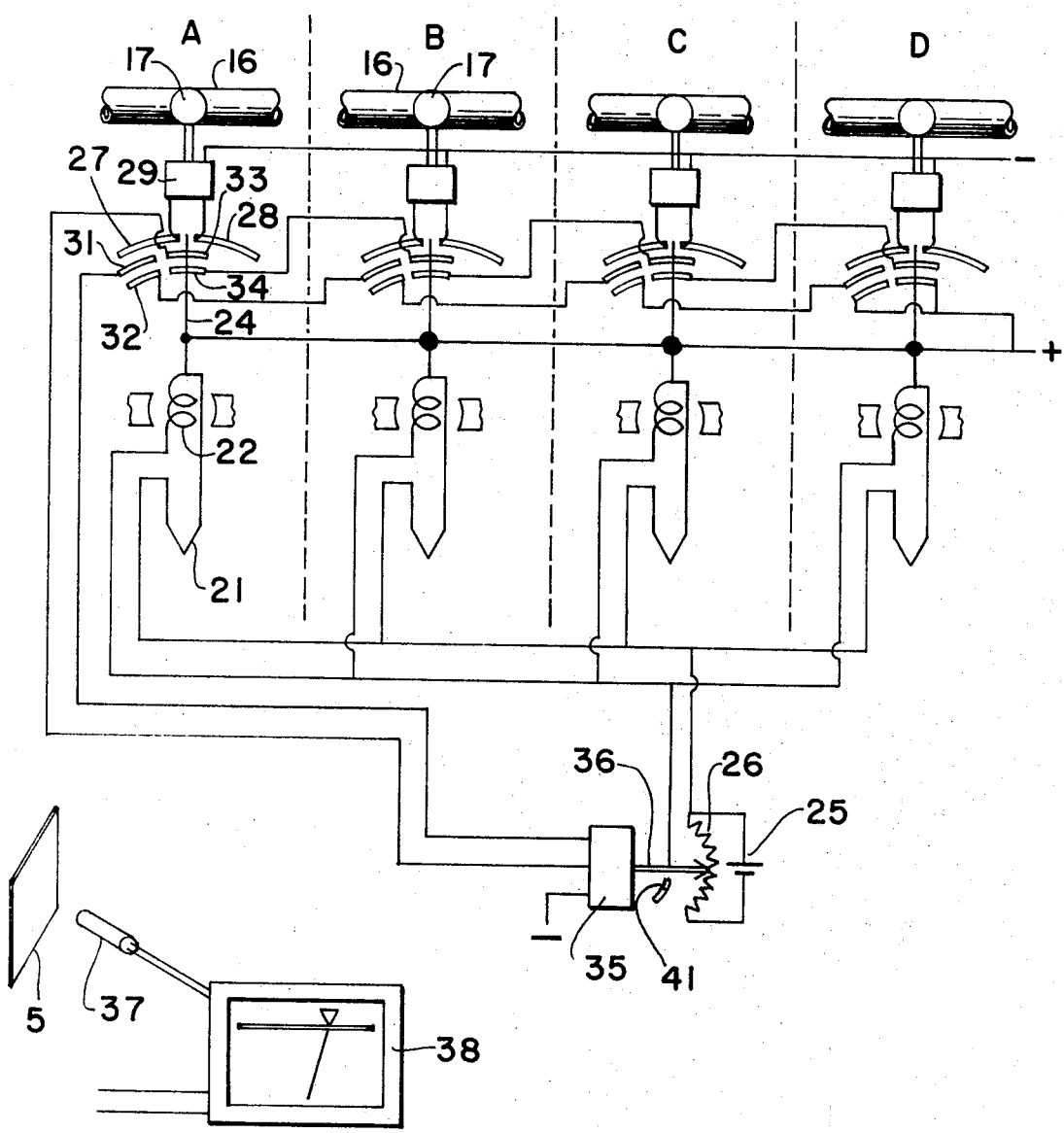
FIG. 3 is a simplified wiring diagram for the control system.

There is also disclosed in FIG. 3 a radiation pyrometer 37 responsive to the temperature of the glass 5 in the furnace which operates through a control instrument 38 to energize a glass indexing mechanism (not shown). The glass can be moved from the furnace to the quench by any conventional means that pulls or pushes carriage 4 along track 3.

When the system is in operation and the temperatures of the various zones are at the set point, the thermocouple voltage of each circuit is equal to the biasing voltage impressed on the circuit by resistance 26. Therefore, pointers 24 will be between contacts 27 and 28 and not deflected.

A cycle of operation of the system starts when a sheet of glass is moved into the furnace. This causes the furnace, in all zones, to cool down. Different zones may cool down at different rates and to different temperatures due to the characteristics of the furnace, the location of the zone relative to the doors closing the ends of the furnace, the size of the glass sheets, and other causes; thus, the heating rates of the different zones could be different with a result of producing nonuniformly heated glass. The present system recognizes this problem and operates to keep the glass heating process under control at all times, not just near the end of the cycle. This is accomplished by moving the set points down, when glass is loaded, in such a way that the temperature of all zones is kept as close as possible during the time when the zone temperatures are dropping. When the zones have stopped cooling the set points are moved back up to the value which will give the final glass temperature, again keeping all zones as close together as possible.

Since all zones are below the set point, pointers 24 will engage contacts 27 to operate the valve motors 29 in a direction to open valves 17, thereby to increase the firing of each zone. Assuming that the zones are all more than 20°F below the set point, a series circuit will be closed through all of the contacts 31 and 32, thereby energizing motor 35 for rotation to move contact 36 in a direction to reduce the bias voltage in the thermocouple circuits, thereby reducing the set point of each zone. If, as the set point moves down, any individual zone lags less than 20°F below the set point, pointer 24 for that zone will not bridge its contacts 31 and 32, thus opening the circuit and stopping motor 35. Under these conditions all zones that are below the stopped set point will be firing in an attempt to get back to that lowered set point. When the lagging zone has cooled to 20°F below the set point, the circuit to motor 35 is again closed, and the set point of all zones is again reduced.

The net effect of this is to maintain all zones, and therefore the entire furnace, as close as possible to the same temperatures during that part of the cycle when cooling takes place as a result of doors being opened and glass being moved into the furnace.

At some temperature which will be a function of the particular furnace and load in the furnace, the coldest zone will stop cooling and begin to heat, passing the down scale position of the set point. When all zones are above 20°F below the reduced set point, pointers 24 will bridge contacts 33 and 34. This completes a circuit in series through all of the contacts 33 and 34 to energize motor 35 to shift contact 36 in a direction to increase the bias voltage in the thermocouple circuits, thereby raising the set point. If any zone lags more than 20°F below the set point, the contacts 33 and 34 for that zone will no longer be bridged, thus stopping motor 35 until that zone catches up. In this manner all zones will be heated to the original set point substantially together, resulting in rapid, uniform heating of the glass.

At some point the set point will reach a value required to heat the glass to its tempering temperature. When this happens, slider 36 will engage a stop 41 to prevent it from moving further along resistance 26. Stop 41 is adjustable to vary the upper limit of movement of 36.

From the above it will be seen that all portions of the glass will be heated evenly since the zones are maintained at substantially the same temperature. The glass is being heated at the same time the furnace temperature is being increased. Because of this the glass will reach its desired temperature almost as soon as the furnace, thereby reducing the soaking time and the possibility of overheating. When the glass reaches its desired temperature as detected by pyrometer 37, instrument 38 will actuate the indexing mechanism to move the glass into the quench. A new sheet of glass can now be placed in the furnace to repeat the cycle.

In order to increase the accuracy with which the glass can be heated, it is desirable to have only those burners which actually face the glass operative. For this purpose valves 13 in the lines supplying individual burners 12 are closed for the burners beyond the edges of the glass. This feature is particularly valuable when glass sheets of different sizes are heated. The burners can be patterned for a particular sheet or groups of sheets. Such operation is made practical only because of the zone temperature control.

In a gas fired vertical furnace, gases which are fired on a specific area of the glass must heat that portion of the glass and be quickly exhausted. With the furnace of this invention this is accomplished by having exhaust openings 18 between the zones. Thus, gases from one zone can be exhausted without having a material effect on another zone.

It will be seen that the invention provides a precisely controlled system that will heat glass rapidly and accurately to the tempering temperature. In addition, the glass is indexed to the quench as soon as it is properly heated instead of waiting a specific time that must be made long enought to provide an error margin for some point on the glass that may not be up to temperature. The several furnace variables are controlled so that the glass can be uniformly heated and transferred to the quench at the lowest possible temperatures and in the shortest possible time.

While in accordance with the provisions of the Statutes we have illustrated and described the best form of embodiment of our invention now known to us, it will be apparent to those skilled in the art that changes may be made in the form of the apparatus disclosed without departing from the spirit and scope of the invention set forth in the appended claims, and that in some cases certain features of our invention may be used to advantage without a corresponding use of other features.

What is claimed is:

1. Means to heat a sheet of glass or the like including, a furnace to direct heat toward opposite sides of said glass, said furnace being divided into zones each extending over a portion of the area of the glass and heating means for directing heat in each zone toward opposite sides of a portion,
   individual means to measure directly the temperature of each zone,
   means actuated in response to said measurements to adjust individually the heating means of each zone toward a common set point temperature,
   means responsive to the decrease in temperature of all of said zones a predetermined amount below said set point operative to adjust said set point downwardly, and
   means to discontinue said adjustment when the temperature of any zone is less than said predetermined amount below said set point.

2. Means to heat a sheet of glass or the like including, a furnace to direct heat toward opposite sides of said glass, said furnace being divided into zones each extending over a portion of the area of the glass and heating means for directing heat in each zone toward opposite sides of a portion,
   individual means to measure directly the temperature of each zone,
   means responsive to the increase of the temperature of each of said zones to less than a predetermined amount below a common set point temperature operative to adjust said set point upwardly,
   means to discontinue said adjustment when the temperature of any of said zones is more than said predetermined amount below said set point, and
   means to limit the upper adjustment of said set point.

3. The method of heating a sheet of glass or the like in a furnace having a plurality of zones each extending over a portion of the area of the glass and separately directing heat toward opposite sides of the portion of the sheet in each zone which comprises
   directly measuring individually the temperature of each zone,
   adjusting the temperature of each zone in response to said measurement toward a common set point temperature value,
   adjusting said set point value downwardly when the temperature of all of the zones is more than a predetermined amount below the set point value, and stopping said adjustment when any one zone is less than said predetermined amount below said set point value.

4. The method of heating a sheet of glass or the like in a furnace having a plurality of zones each extending over a portion of the area of the glass and separately directing heat toward opposite sides of the portion of the sheet in each zone which comprises
   directly measuring individually the temperature of each zone,
   adjusting the temperature of each zone in response to said measurement toward a common set point temperature value,
   adjusting the set point value upwardly when the temperature of all the zones is within a predetermined amount below the set point value,
   stopping said adjustment when the temperature of any zone is more than said predetermined amount below said set point value, and
   limiting the upward adjustment of said set point value to a temperature which will heat the glass to a desired value.

5. The method of heating a sheet of glass to a predetermined temperature which comprises
   inserting the glass into a furnace having a plurality of zones the temperature of which can be individually adjusted, the temperature of all zones falling when the glass is inserted in the furnace,
   directly controlling the temperature of said zones individually toward a common set point temperature, adjusting the set point of each zone downwardly from said predetermined temperature when the temperature of all zones is a given amount below the set point,
   stopping said downward adjustment while one zone is less than said given amount below the set point, adjusting the set point of each zone upwardly toward said predetermined temperature when the temperature of each zone is less than said given amount below the set point, stopping said upward adjustment while any zone temperature is more than said given amount below the set point, stopping the upward adjustment when the set point has reached said predetermined temperature, and removing the glass from said furnace when its temperature reaches said predetermined temperature.

6. The method of heating a sheet of glass for tempering which comprises providing heating means on opposite sides of said sheet, dividing the heating means into a plurality of zones with each zone having a portion thereof on opposite sides of said sheet, individually adjusting the heating means of each of said zones to maintain the temperature at substantially the same value, varying a common set point for the temperature of all of said zones as and in the direction of temperature changes of said zones, and removing said sheet of glass from the furnace when the temperature thereof has reached a desired value.

7. The method of heating a sheet of glass for tempering in a furnace that has a plurality of zones the temperature of each of which can be individually adjusted which comprises, directly measuring the temperature of each zone individually, adjusting a common set point for the temperature of the zones downwardly if the temperature of said zones is falling, adjusting the common set point for the temperature of the zones upwardly if the temperature of the zones is rising, stopping the adjustment of the set point in either direction when the temperature of any zone varies more than a predetermined amount from the set point at any adjustment, and limiting the maximum temperature to which the set point can be adjusted to a value which will bring the glass to tempering temperature.

8. The method of heating glass to tempering temperature in a furnace having a plurality of individually controlled zones which comprises, directly measuring individually the temperature of each zone, in response to said measurement individually adjusting the fuel supply for each zone to bring the temperature of each zone back toward a desired common set point value, adjusting the set point for all zones downwardly as long as each zone is no more than a predetermined amount below the common set point, adjusting the set point for all zones upwardly as long as each zone is no more than said predetermined amount below the common set point, terminating the upward adjustment of the common set point when it has reached a value that will result in a glass temperature suitable for tempering, and removing the glass from the furnace when it has reached tempering temperature.

9. The method of controlling the temperature of a sheet of glass for tempering which comprises, placing the glass in a furnace having a plurality of individually controlled zones, the glass when placed in the furnace initially causing the temperature of each zone to fall, individually measuring the temperature of each zone directly, reducing the set point of all zones while the temperature of the zones is falling, increasing the set point of all zones to a maximum temperature while the temperature of the zones is rising, individually controlling the temperature of each zone toward the set point thereof, and removing the glass from the furnace when it has reached the desired temperature.

* * * * *

UNITED STATES PATENT OFFICE
CERTIFICATE OF CORRECTION

Patent No. 3,841,855   Dated OCTOBER 15, 1974

Inventor(s) William S. Montgomery, Jr., William E. Marceau, and William G. Bates It is certified that error appears in the above-identified patent and that said Letters Patent are hereby corrected as shown below:

Column 2, line 10, the word "particularity" should be deleted.

Claim 8, Column 8, line 13, the word "no" should be deleted.

Signed and sealed this 11th day of February 1975.

(SEAL)
Attest:

RUTH C. MASON
Attesting Officer

C. MARSHALL DANN
Commissioner of Patents
and Trademarks